United States Patent
Gibbons et al.

(10) Patent No.: US 10,387,142 B2
(45) Date of Patent: Aug. 20, 2019

(54) USING ANNOTATION PROCESSORS DEFINED BY MODULES WITH ANNOTATION PROCESSORS DEFINED BY NON-MODULE CODE

(71) Applicant: Oracle International Corporation, Redwood City, CA (US)

(72) Inventors: Jonathan J. Gibbons, Mountain View, CA (US); Vicente A. Romero Zaldivar, Miami, FL (US); Jan Lahoda, Polná (CZ); Joseph Darcy, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 106 days.

(21) Appl. No.: 15/267,896

(22) Filed: Sep. 16, 2016

(65) Prior Publication Data
US 2018/0081677 A1 Mar. 22, 2018

(51) Int. Cl.
*G06F 8/70* (2018.01)
*G06F 17/24* (2006.01)
*G06F 8/41* (2018.01)

(52) U.S. Cl.
CPC .............. *G06F 8/70* (2013.01); *G06F 8/41* (2013.01); *G06F 17/241* (2013.01)

(58) Field of Classification Search
CPC .............................................. G06F 8/00–8/78
See application file for complete search history.

(56) References Cited

U.S. PATENT DOCUMENTS

| | | |
|---|---|---|
| 6,572,661 B1 | 6/2003 | Stern |
| 6,883,163 B1 | 4/2005 | Schwabe |
| 6,951,022 B1 | 9/2005 | Golde et al. |
| 6,981,245 B1 | 12/2005 | Schwabe |
| 6,983,460 B1 | 1/2006 | Goire et al. |
| 6,986,132 B1 | 1/2006 | Schwabe |
| 7,032,216 B1 | 4/2006 | Nizhegorodov |
| 7,051,323 B2 | 5/2006 | Lam et al. |
| 7,228,532 B1 | 6/2007 | Shaylor et al. |
| 7,243,306 B1 | 7/2007 | Joshi et al. |
| 7,360,206 B1 | 4/2008 | Hatcher |
| 7,487,507 B1 | 2/2009 | Lun et al. |
| 7,503,031 B2 | 3/2009 | Chang et al. |
| 7,565,364 B1 * | 7/2009 | Darcy ....................... G06F 8/30 |
| 7,840,939 B1 | 11/2010 | Chinnici |

(Continued)

OTHER PUBLICATIONS

Pawlak, Renaud. "Spoon: annotation-driven program transformation—the AOP case." Proceedings of the 1st workshop on Aspect oriented middleware development. ACM. (Year: 2005).*

(Continued)

*Primary Examiner* — Chameli Das
*Assistant Examiner* — Joanne G Macasiano
(74) *Attorney, Agent, or Firm* — Invoke

(57) ABSTRACT

Annotation processors defined by a module of a module system are used for processing annotations. Annotation processors defined by a module of a module system may be used with annotation processors defined by non-module code. A predefined deterministic process is used to select annotation processors for processing annotations. The predefined deterministic process imposes an order for searching and/or using annotation processors.

46 Claims, 6 Drawing Sheets

(56) References Cited

U.S. PATENT DOCUMENTS

| | | | |
|---|---|---|---|
| 7,895,445 B1 | 2/2011 | Albanese et al. | |
| 7,966,602 B1 * | 6/2011 | Webster | G06F 8/48 717/114 |
| 8,082,542 B2 | 12/2011 | Bottomley et al. | |
| 8,307,352 B2 | 11/2012 | Mausolf et al. | |
| 8,352,925 B2 | 1/2013 | Russell et al. | |
| 8,584,104 B2 | 11/2013 | Gibbons et al. | |
| 9,069,568 B2 | 6/2015 | Schmidt et al. | |
| 9,069,582 B2 | 6/2015 | Mausolf et al. | |
| 9,098,715 B1 | 8/2015 | Spear, Jr. et al. | |
| 9,116,707 B2 | 8/2015 | Reinhold et al. | |
| 9,292,315 B1 | 3/2016 | Dawson et al. | |
| 9,298,448 B2 | 3/2016 | Eliás et al. | |
| 9,323,501 B1 | 4/2016 | Ielceanu et al. | |
| 9,336,018 B2 | 5/2016 | Zhou et al. | |
| 9,361,070 B1 | 6/2016 | Nuss | |
| 9,489,214 B2 | 11/2016 | Cobb | |
| 9,656,171 B2 | 5/2017 | Itsuno | |
| 2002/0120717 A1 | 8/2002 | Giotta | |
| 2003/0009747 A1 | 1/2003 | Duran | |
| 2003/0041167 A1 | 2/2003 | French et al. | |
| 2003/0041238 A1 | 2/2003 | French et al. | |
| 2003/0101381 A1 | 5/2003 | Mateev et al. | |
| 2003/0191864 A1 | 10/2003 | Govindarajapuram et al. | |
| 2004/0003079 A1 | 1/2004 | Aiu et al. | |
| 2004/0181471 A1 | 9/2004 | Rogers | |
| 2005/0050528 A1 | 3/2005 | Wang | |
| 2005/0055681 A1 | 3/2005 | Gadre | |
| 2005/0055682 A1 | 3/2005 | Gadre et al. | |
| 2005/0193137 A1 | 9/2005 | Farnham | |
| 2005/0198624 A1 | 9/2005 | Chipman | |
| 2005/0216885 A1 | 9/2005 | Ireland | |
| 2005/0234891 A1 | 10/2005 | Walther et al. | |
| 2006/0026126 A1 | 2/2006 | Cabillic | |
| 2006/0074989 A1 | 4/2006 | Laborczfalvi et al. | |
| 2006/0101092 A1 | 5/2006 | Ishida et al. | |
| 2006/0190935 A1 | 8/2006 | Kielstra et al. | |
| 2006/0265760 A1 | 11/2006 | Daemke et al. | |
| 2006/0277456 A1 | 12/2006 | Biberstein et al. | |
| 2006/0277523 A1 | 12/2006 | Horen et al. | |
| 2006/0288353 A1 | 12/2006 | King et al. | |
| 2007/0006141 A1 | 1/2007 | Bracha et al. | |
| 2007/0011451 A1 | 1/2007 | Botzum et al. | |
| 2007/0011723 A1 | 1/2007 | Chao | |
| 2007/0027907 A1 | 2/2007 | Kulkarni et al. | |
| 2007/0061456 A1 | 3/2007 | Waris | |
| 2007/0192380 A1 | 8/2007 | Tabellion et al. | |
| 2007/0192830 A1 | 8/2007 | O'Connor | |
| 2007/0288280 A1 | 12/2007 | Gilbert et al. | |
| 2008/0010649 A1 | 1/2008 | Grimaud et al. | |
| 2008/0022260 A1 | 1/2008 | Kinder et al. | |
| 2008/0091792 A1 | 4/2008 | Mei et al. | |
| 2008/0127070 A1 | 5/2008 | Barcia et al. | |
| 2008/0134154 A1 | 6/2008 | Patel et al. | |
| 2008/0134207 A1 | 6/2008 | Chamieh et al. | |
| 2008/0172656 A1 | 7/2008 | Russell et al. | |
| 2008/0172658 A1 | 7/2008 | Russell et al. | |
| 2008/0276231 A1 | 11/2008 | Huang et al. | |
| 2008/0282266 A1 | 11/2008 | Kabanov | |
| 2009/0070792 A1 | 3/2009 | Cable | |
| 2009/0100404 A1 | 4/2009 | Chaturvedi et al. | |
| 2009/0113406 A1 | 4/2009 | Bandaram et al. | |
| 2009/0133001 A1 | 5/2009 | Rozenfeld | |
| 2009/0150864 A1 | 6/2009 | Meijer et al. | |
| 2009/0164760 A1 | 6/2009 | Sterbenz | |
| 2009/0249311 A1 | 10/2009 | Dandamudi et al. | |
| 2010/0083004 A1 | 4/2010 | Kirshenbaum | |
| 2011/0029960 A1 | 2/2011 | Cimadamore et al. | |
| 2011/0131561 A1 | 6/2011 | Adams, III et al. | |
| 2011/0145278 A1 | 6/2011 | Maes | |
| 2011/0239184 A1 | 9/2011 | Feigen | |
| 2011/0271251 A1 | 11/2011 | Buckley et al. | |
| 2011/0271254 A1 | 11/2011 | Reinhold et al. | |
| 2011/0283256 A1 | 11/2011 | Raundahl Gregersen et al. | |
| 2011/0302565 A1 | 12/2011 | Ferris et al. | |
| 2011/0307858 A1 | 12/2011 | Biswas et al. | |
| 2011/0321019 A1 | 12/2011 | Gibbons et al. | |
| 2012/0005660 A1 | 1/2012 | Goetz et al. | |
| 2012/0036462 A1 | 2/2012 | Schwartz et al. | |
| 2012/0096433 A1 | 4/2012 | Reinhold et al. | |
| 2012/0117538 A1 | 5/2012 | Buckley | |
| 2012/0151505 A1 | 6/2012 | Verissimo de Oliveira | |
| 2012/0210308 A1 | 8/2012 | Goetz et al. | |
| 2012/0210320 A1 | 8/2012 | Goetz et al. | |
| 2012/0272214 A1 | 10/2012 | Goetz et al. | |
| 2012/0278797 A1 | 11/2012 | Secrist et al. | |
| 2012/0311531 A1 | 12/2012 | Lebert | |
| 2012/0317589 A1 | 12/2012 | Foti | |
| 2013/0007706 A1 | 1/2013 | Burckart et al. | |
| 2013/0125202 A1 | 5/2013 | Sprague et al. | |
| 2013/0232469 A1 | 9/2013 | Agarwal | |
| 2013/0339926 A1 | 12/2013 | Raundahl Gregersen et al. | |
| 2014/0089907 A1 | 3/2014 | Cabillic et al. | |
| 2014/0130020 A1 | 5/2014 | Boshernitsan et al. | |
| 2014/0137075 A1 | 5/2014 | Said et al. | |
| 2014/0173574 A1 | 6/2014 | Schmidt et al. | |
| 2014/0189672 A1 | 7/2014 | Raundahl et al. | |
| 2014/0237176 A1 | 8/2014 | Takefman et al. | |
| 2014/0245275 A1 | 8/2014 | Elias et al. | |
| 2014/0282441 A1 | 9/2014 | Hoban et al. | |
| 2014/0351802 A1 | 11/2014 | Elias et al. | |
| 2014/0358972 A1 | 12/2014 | Guarrieri et al. | |
| 2015/0026703 A1 | 1/2015 | Foti | |
| 2015/0089478 A1 | 3/2015 | Cheluvaraju et al. | |
| 2015/0113172 A1 | 4/2015 | Johnson et al. | |
| 2015/0186129 A1 | 7/2015 | Apte et al. | |
| 2015/0331681 A1 | 11/2015 | Rose et al. | |
| 2015/0363174 A1 | 12/2015 | Rose et al. | |
| 2015/0378752 A1 | 12/2015 | Stoodley | |
| 2016/0011982 A1 | 1/2016 | Sandoz et al. | |
| 2016/0011992 A1 | 1/2016 | Sandoz et al. | |
| 2016/0055014 A1 | 2/2016 | Gallimore et al. | |
| 2016/0055344 A1 | 2/2016 | Peterson et al. | |
| 2016/0062878 A1 | 3/2016 | Westrelin et al. | |
| 2016/0087933 A1 | 3/2016 | Johnson et al. | |
| 2016/0098346 A1 | 4/2016 | Pechanec et al. | |
| 2016/0148013 A1 | 5/2016 | Taldo et al. | |
| 2016/0154658 A1 | 6/2016 | Stoodley | |
| 2016/0210445 A1 | 7/2016 | Deaver | |
| 2016/0232017 A1 | 8/2016 | Raundahl Gregersen | |
| 2016/0266875 A1 | 9/2016 | Takahashi | |
| 2016/0344745 A1 | 11/2016 | Johnson et al. | |
| 2016/0357586 A1 | 12/2016 | Rose | |
| 2017/0024188 A1 | 1/2017 | Buckley et al. | |
| 2017/0024196 A1 | 1/2017 | Buckley et al. | |
| 2017/0039043 A1 | 2/2017 | Haupt et al. | |
| 2017/0063874 A1 | 3/2017 | Buckley et al. | |
| 2017/0068520 A1 | 3/2017 | Buckley et al. | |
| 2017/0269929 A1 | 9/2017 | Hegarty et al. | |
| 2017/0272316 A1 | 9/2017 | Johnson et al. | |
| 2018/0074815 A1 | 3/2018 | Alabes et al. | |
| 2018/0336041 A1 | 11/2018 | James et al. | |

OTHER PUBLICATIONS

Erni, David, and Adrian Kuhn. "The Hacker's Guide to javac." University of Bern, Bachelor's thesis, supplementary documentation (Year: 2008).*

Hidalgo, Jorge, "JavaOne 2014—CON2013—Code Generation in the Java Compiler: Annotation Processors Do the Hard Work", Available online at <http://www.slideshare.net/deors/javaone-2014-con2013-code-generation-in-the-java-compiler-annotation-processors-do-the-hard-work>, Oct. 1, 2014, 11 pages.

Trance, Macphail, "Code Generation using Annotation Processors in the Java language—part 2: Annotation Processors", Available online at <https://deors.wordpress.com/2011/10/08/annotation-processors/>, Oct. 8, 2011, 14 pages.

Buckley, Alex, "Project Jigsaw: Under The Hood", Java Platform Group, Oracle, Oct. 2015, 62 pages.

McManus et al., "Plugging into the Java Compiler", JavaOne, 2014, 58 pages.

Github, "Dagger 2", Google, Available online at <https://github.com/googledagger/>, Copyright 2012, 3 pages.

(56) References Cited

OTHER PUBLICATIONS

Breslav, Andrey, "kapt: Annotation Processing for Kotlin", Kotlin Blog, Available online at <http://blogjetbrains.com/kotlin/2015/05/kapt-annotation-processing-for-kotlin/>, May 21, 2015, 8 pages.
Breslav, Andrey, "Better Annotation Processing: Supporting Stubs in kapt", Kotlin Blog, Available online at <http://blog.jetbrains.com/kotlin/2015/06/better-annotation-processing-supporting-stubs-in-kapt/>, Jun. 22, 2015, 6 pages.
Github, "Dagger 1", Square, Available online at <https://github.com/square/dagger>, Copyright 2012, 2 pages.
Github, "jboss-logging", Available online at <https://github.com/jboss-logging/jboss-logging-tools/blob/2.0.1.Final/processor/src/main/java/org/jboss/logging/processor/apt/LoggingToolsProcessorjava>, Copyright 2016, 3 pages.
Morling, Gunnar, "[Jigsaw] Getting "Bad Service Configuration File" Error with Annotation Processor", Available online at <http://mail.openjdk.java.net/pipermail/compiler-dev/2016-February/009985.html>, Feb. 9, 2016, 1 page.
Oracle, "Getting Started with the Annotation Processing Tool (apt)", Java, Available online at <http://docs.oracle.com/javase/1.5.0/docs/guide/apt/GettingStarted.html#AnnotationProcessor>, Copyright 2004, 2010, 8 pages.
Oracle, "Interface Iterable<T>", Java Platform Standard Ed. 8, Available online at <http://docs.oracle.com/javase/8/docs/api/java/lang/Iterable_html>, Copyright 1993, 2016, 3 pages.
Oracle, "The Java™ Tutorials", Java Documentation, Available online at <https://docs.oracle.com/javase/tutorial/java/annotations/basics.html>, Copyright 1995, 2015, 2 pages.
Darcy, Joseph D., "JSR 269 Maintenance Review for Java SE 8", Oracle Weblog, Java, Available online at <https://blogs.oracle.com/darcy/tags/annotationprocessing>, Dec. 8, 2013, 9 pages.
Darcy, Joseph D., "Project Coin: Bringing it to a Close(able)", Oracle Weblog, Java, Available online at < https://blogs.oracle.com/darcy/entry/project_coin_bring_close>, Jul. 6, 2010, 5 pages.
"Oracle and/or its Affiliate", Available online at <https://blogs.oracle.com/darcy/resource/ProjectCoin/CloseableFinder.java>, Copyright 2016, 3 pages.
Darcy, Joseph D., "Properties via Annotation Processing", Oracle Weblog, Java, Available online at <https://blogs.oracle.com/darcy/entry/properties_via_annotation_processing>, Sep. 2, 2009, 6 pages.

Bracha et al., "Mirrors: Design Principles for Meta-level Facilities of Object-Oriented Programming Languages", OOPSLA '04 Proceedings of the 19th annual ACM SIGPLAN conference on Object-oriented programming, systems, languages, and applications, Oct. 24-28, 2004, 14 pages.
Stack Overflow, "What's the difference between 'package' and 'module'" (last accessed on Dec. 6, 2016).
NetBeans, "What is a module" (last accessed on Dec. 6, 2016).
Faycal et al., "An Agent Based Encapsulator System for Integrating and Composing Legacy System Functionalities", Proceedings of the 2015 IEEE / WIC / ACM International Conference on Web Intelligence and Intelligent Agent Technology (WI-IAT), vol. 1, Dec. 6-9, 2015, pp. 84-87.
Reis et al., "A Module System for C++", Modules SG, May 27, 2014, pp. 1-22.
Rossberg et al., "Mixin Up the ML Module System", ACM Transactions on Programming Languages and Systems, vol. 35, No. 1, Article 2, Apr. 2013, pp. 2:1-2:84.
Martin Konopka, "Identifying Hidden Source Code Dependencies from Developer's Activity", Spring 2014 PeWe Workshop, Mar. 2014, pp. 67-68 <https://www.pewe.sk/wp-content/uploads/2016/01/67_konopka.pdf>.
Kang et al., "Formal Specification of a JavaScript Module System", ACM, Oct. 2012, pp. 621-638; <https://dl.acm.org/citation.cfm?id=581692>.
Horre et al., "Eliminating Implicit Dependencies in Component Models", IEEE, Feb. 2012, pp. 1-6; <https://ieeexplore.ieee.org/stamp/stamp.jsp tp=&arnumber=6144945>.
Rodrigo Teixeira et al.; Does It Make Sense to Have Application-Specific Code Conventions as a Complementary Approach to Code Annotations; ACM; pp. 15-22; <https://dl.acm.org/citation.cfm?id=3281078>; retrieved on Mar. 15, 2019 (Year: 2018).
Phyllipe Lima et al.; An Annotation-Based API for Supporting Runtime Code Annotation Reading; ACM; pp. 6-14; <https://dl.acm.org/citation.cfm?id=3141856>; retrieved on Mar. 15, 2019 (Year: 2017).
Darren Lunn et al.; Combining SADIe and AxsJAX to Improve the Accessibility of Web Content; ACM; pp. 7578; <https://dl.acm.org/citation.cfm?id=1535672>; retrieved on Mar. 15, 2019 (Year: 2009).

* cited by examiner

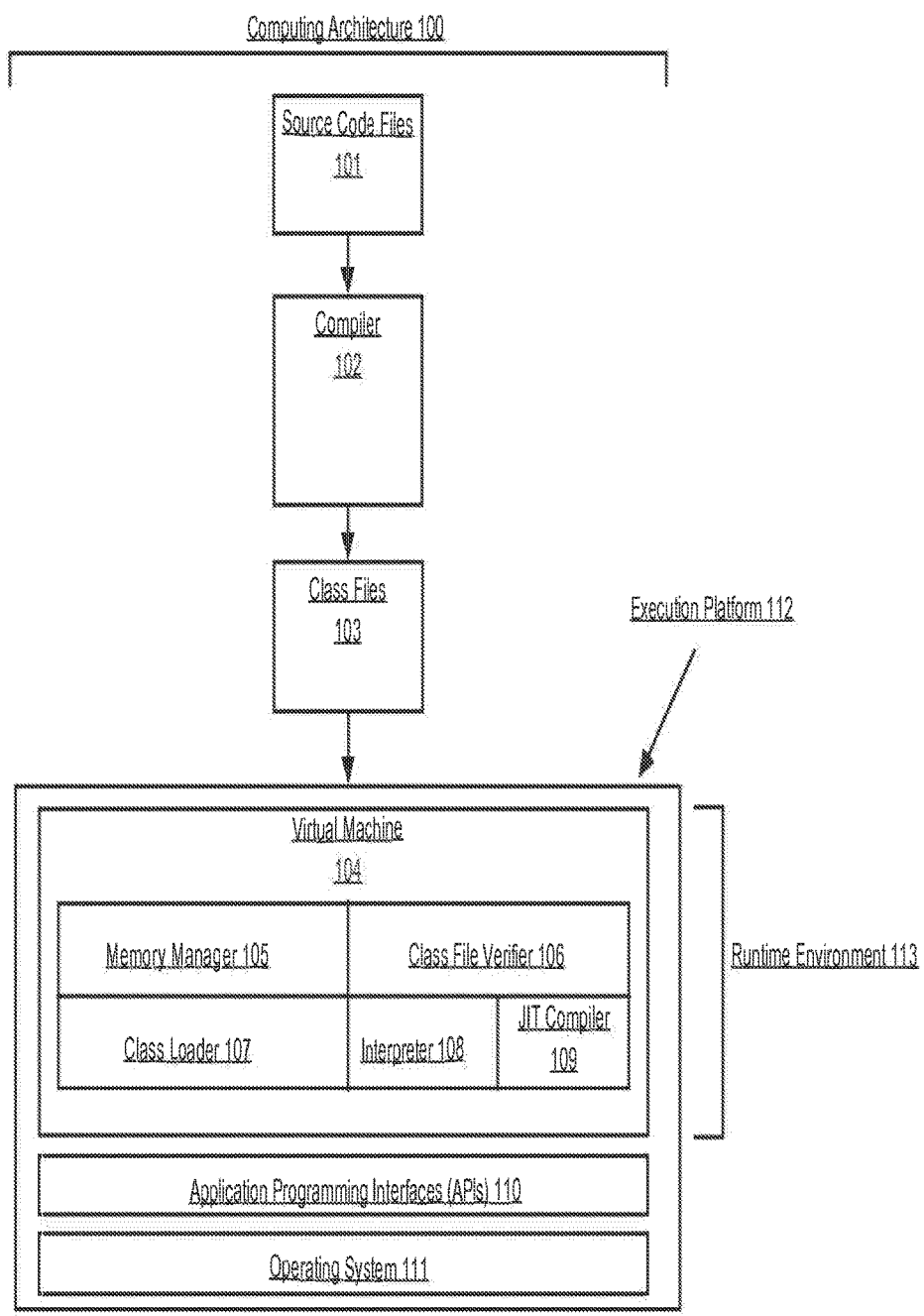

USING ANNOTATION PROCESSORS DEFINED BY MODULES WITH ANNOTATION PROCESSORS DEFINED BY NON-MODULE CODE

RELATED APPLICATIONS; INCORPORATION BY REFERENCE

This application is related to (1) U.S. Pat. No. 7,565,364, titled "Annotation Processor Discovery", (2) U.S. Pat. No. 7,499,956, titled "Annotation Processing From Source Files and Class Files", (3) application Ser. No. 14/808,590 filed Jul. 24, 2015, and (4) application Ser. No. 14/808,689 filed Jul. 24, 2015, (5) U.S. patent application Ser. No. 14/847,800 filed Sep. 8, 2015, and (6) U.S. patent application Ser. No. 14/847,833 filed Sep. 8, 2015, each of which is hereby incorporated by reference as if fully set forth herein.

TECHNICAL FIELD

The present disclosure relates to annotation processors. In particular, the present disclosure relates to techniques for using annotation processors defined by non-module code with annotation processors defined by modules.

BACKGROUND

Annotations are a form of metadata. Annotations may or may not have a direct effect on the operation of the artifact that the annotations annotate.

Annotations have a number of uses including but not limited to:
  a. Enforce semantics—Annotations can be used by a compiler to enforce semantics explicitly declared by a user
  b. Information for the compiler—Annotations can be used by the compiler to detect errors or suppress warnings.
  c. Compile-time and deployment-time processing—Software tools can process annotations to generate, for example, code and XML files.
  d. Runtime processing—Some annotations are available to be examined at runtime.

Annotations may be processed using annotation processors. Annotation processors may, for example, use a set of reflective Application Programming Interfaces (API) and supporting infrastructure to perform the processing of annotations. Annotation processors may process annotations detected in source code, class files, or other compiled representations or executable output. Executable output, as referred to herein, may correspond to the output of a Compiler or other tools that is intended to be executed by a Runtime Interpreter. As an example, annotation processors may process a first annotation(s), resulting in the production of new source files having further annotations that are to be iteratively processed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 2A illustrates an example computing architecture in which techniques described herein may be practiced;

DETAILED DESCRIPTION

Figure 1:
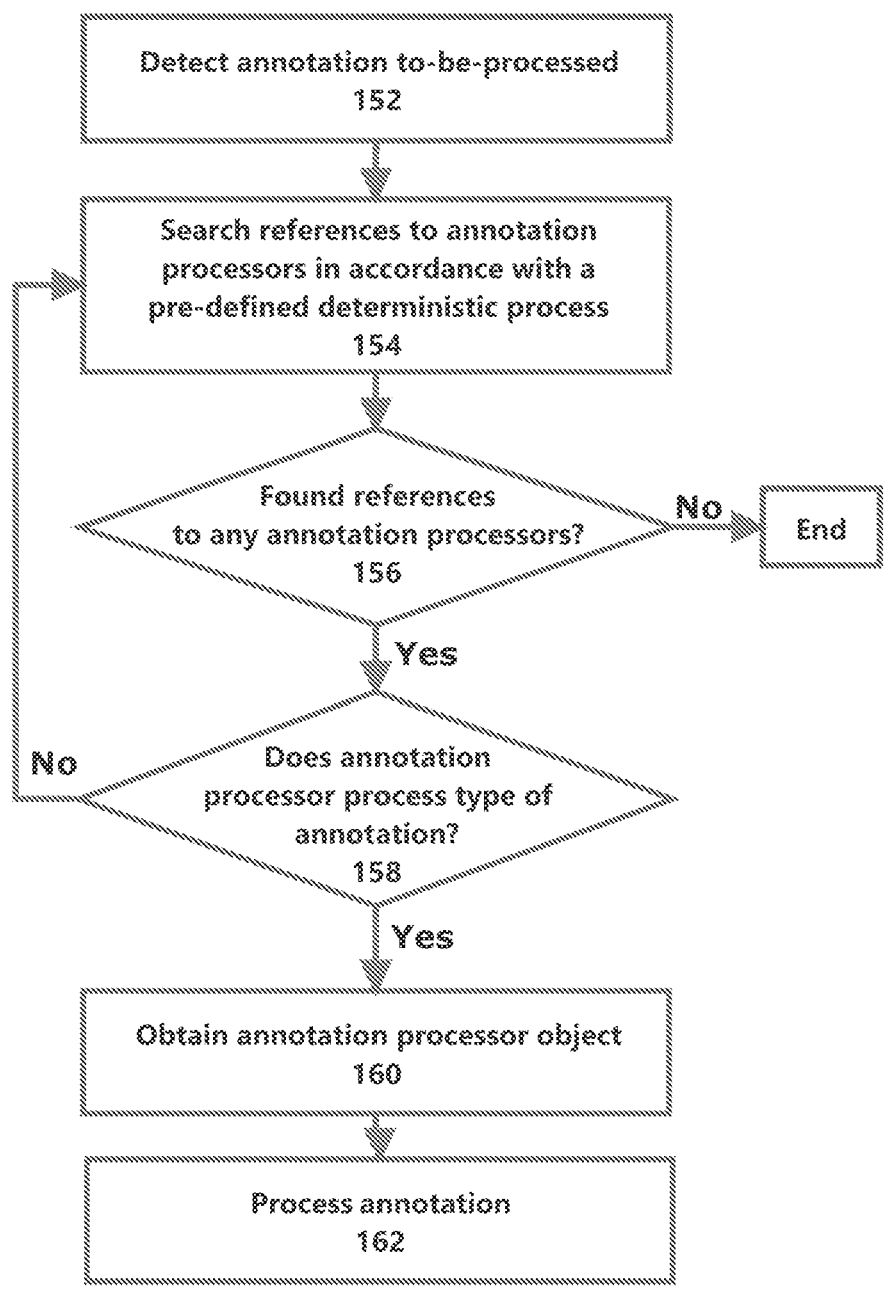
FIG. 1 illustrates operations for processing annotations in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. MODULE SYSTEM
3. ANNOTATIONS
4. ANNOTATION PROCESSORS
5. DETERMINISTIC SELECTION OF ANNOTATION PROCESSORS
6. ARCHITECTURAL OVERVIEW
   6.1 EXAMPLE CLASS FILE STRUCTURE
   6.2 EXAMPLE VIRTUAL MACHINE ARCHITECTURE
   6.3 LOADING, LINKING, AND INITIALIZING
7. HARDWARE OVERVIEW

1. General Overview

One or more embodiments include processing a set of annotations using at least one annotation processor defined by a module of a module system. In addition, the set of annotations may be processed using at least one annotation processor defined by non-module code.

One or more embodiments includes the use of a single processor path referencing both an annotation processor defined by non-module code and an annotation processor defined by a module of a module system. Alternatively, or additionally, at least two different processor paths may respectively reference annotation processors defined by non-module code and annotation processors defined by a module of a module system.

One or more embodiments include searching for annotation processors, included in a processor path, using a deterministic process. The deterministic process may be a predefined deterministic process (stored, specified, or otherwise defined prior to use of the process in searching for and/or selecting annotation processors for processing annotations). The predefined deterministic process may identify an annotation processor which claims to process a type of the annotation to-be-processed. The predefined deterministic process may impose an ordering to search for and/or select an annotation processor for use in processing annotations. The first annotation processor that (a) claims to process a type of the annotation to-be-processed and (b) is found in a search based on the ordering imposed by a deterministic process is selected for processing the annotation to-be-processed. Examples of ordering of annotation processors for searching/selecting may include, but are not limited to:

a. Ordering annotation processors defined by modules in a module system prior to annotation processors defined by non-module code.
b. Ordering annotation processors defined by non-module code prior to annotation processors defined by modules in a module system.
c. Ordering annotation processors in accordance with an order by which they are referenced by a processor path regardless of whether the annotation processors correspond to non-module code or correspond to any module in a module system.
d. Ordering annotation processors in accordance with a defined order independent of one or more processor paths.

Examples of ordering described above may be used before or after other types of ordering. For example, a first level of ordering may involve ordering all annotation processors defined by modules in a module system ("Category A" annotation processors) before annotation processors defined by non-module code ("Category B" annotation processors). Thereafter, a second level of ordering may be applied to annotation processors in each of category A and category B.

One or more embodiments described in this Specification and/or recited in the claims may not be included in this General Overview section.

2. Module System

In an embodiment, a module system is a system for implementing code that is organized in a set of modules. A module system may include: named explicit modules, named automatic modules, and/or unnamed modules. A module system may execute operations to modularize non-module code.

In an embodiment, a named explicit module is a self-describing collection of code and/or data. The code is organized as a set of one or more packages (also referred to herein as "libraries"). Each package includes one or more types (such as classes and interfaces). A particular module's self-description is expressed in the particular module's module declaration. The module declaration declares the name (or other reference) of the particular module.

Additionally or alternatively, the module declaration identifies one or more other modules on which the particular module depends. The dependency between modules may be expressed using, for example, a requires clause. As an example, Module A depends on Module B, if a type associated with Module A references a type associated with Module B. A module declaration of Module A may include, "requires B," to indicate the dependency.

Additionally or alternatively, the module declaration identifies one or more packages of the particular module that are exported to other modules. The exportation may be expressed using, for example, an exports clause. Types, of the exported packages, that have been declared as public may be available for use by other modules.

A named explicit module may be packaged into a module artifact. The module artifact includes class files of the types associated with the packages of the module. The module artifact also includes the module declaration of the module. The module artifact may be a compressed version of the contents. A module artifact may also be referred to herein as a "module source."

Named explicit modules may be modules that are built into a compile-time environment or runtime environment 112. A runtime image may store code and data associated with the runtime environment 112, including the built-in modules.

In an embodiment, modularized non-module code includes one or more types (1) whose package(s) are not defined in any named explicit module and (2) that are loaded from a namespace, which is defined by the host system. The namespace is an ordered list of entries. Each entry is a type, or a directory or artifact including types.

The modularized non-module code does not include any explicit module declaration. The modularized non-module code includes an implicit dependency to every other module in the module system. The modularized non-module code includes an implicit exportation of all of its type groups. However, a named explicit module is not allowed to depend on an modularized non-module code.

In an embodiment, a named automatic module (also referred to herein as an "automatic module" or "bridge module") includes one or more types (1) whose package(s) are not defined in any named explicit module and (2) that are loaded from a module path. The automatic module does not include any explicit module declaration. The automatic module includes an implicit dependency to every other module in the module system. The automatic module includes an implicit exportation of all of its type groups. Meanwhile, a named explicit module is allowed to depend on a named automatic module.

3. Annotations

As described above, annotations are a form of metadata. Annotations may or may not have a direct effect on the operation of the artifacts (e.g., source code or class files) that the annotations annotate. Annotations may be used to direct a compiler or a runtime environment to perform checks on or operations associated with the artifacts being processed by the compiler or runtime environment.

An annotation may be added in association with an artifact by a developer. Source code and/or a compiler's executable output may be read and in some cases, overwritten. Direct modification of source code and/or a compiler's executable output may or may not be possible, depending on the implementation. An annotation may be added by an annotation processor during the processing of another annotation. An annotation may be included in a class file by a compiler that compiles source code to generate the class file. The annotation, included in the class file, may or may not be based on an annotation in a source file that was compiled to generate the class file. An annotation corresponding to an artifact may be included in the same file as the artifact, adjacent or non-adjacent to the corresponding artifact. An artifact being annotated by an annotation may be identified based on a placement of an annotation in relation to the artifact within a file. For example, any artifact following an annotation may be determined to be corresponding to the annotation.

As noted above, annotations have a number of uses including but not limited to:

a. Enforce semantics—Annotations can be used by a compiler to enforce semantics explicitly declared by a user.
b. Information for the compiler—Annotations can be used by the compiler to detect errors or suppress warnings.
c. Compile-time and deployment-time processing—Software tools can process annotations to generate, for example, code and XML files.
d. Runtime processing—Some annotations are available to be examined at runtime.

A variety of different symbols, keywords, or special characters may be used to identify annotations. Examples described herein may reference specific symbols, keywords, or special characters (e.g., '@') which should not be construed as limiting the scope of any of the claims.

As an example, an annotation may be expressed as:
@Entity

The at sign character (@) indicates to a compiler (or other code/program) that what follows is an annotation. In the following example, the annotation's name is Override and the annotation annotates the method mySuperMethod( ) which immediately follows the annotation:
@Override
void mySuperMethod( ) { . . . }

The annotation may include elements with corresponding values. As an example, an annotation Author may include the elements name and date with corresponding values as noted below:

```
@Author(
    name = "Benjamin Franklin",
    date = "3/27/2003"
)
class MyClass( ) { ... }
```

As another example, an annotation Suppress Warnings may include an element status with a corresponding named value as noted below:

```
@SuppressWarnings(status = "unchecked")
void myMethod( ) { ... }
@Target({TYPE, FIELD, METHOD, PARAMETER, CONSTRUCTOR, LOCAL_VARIABLE})
@Retention(RetentionPolicy.SOURCE)
public @interface SuppressWarnings {
    String[ ] value( );
}
```

If there is only one element named status, then the name can be omitted, as noted below:
@SuppressWarnings("unchecked")
void myMethod( ) { . . . }

If the annotation has no elements, then the parentheses ( ) for elements can be omitted altogether, as shown in the previous @Override example.

It is also possible to use multiple annotations on the same declaration:
@Author(name="Jane Doe")
@EBook
class MyClass { . . . }

If the annotations have the same type, then the annotations may be referred to as a repeating annotation. As an example, a repeating annotation Author is noted below:
@Author(name="Jane Doe")
@Author(name="John Smith")
class MyClass { . . . }

Annotations can be applied to declarations of classes, fields, methods, and other program elements. When applied to a declaration, each annotation may appear on its own line. Furthermore, annotations may also be applied to the use of types. Some examples include:

```
// Class instance creation expression:
    new @Interned MyObject( );
// Type cast:
    myString = (@NonNull String) str;
```

```
// implements clause:
    class UnmodifiableList<T> implements
        @Readonly List<@Readonly T> { ... }
// Thrown exception declaration:
    void monitorTemperature( ) throws
        @Critical TemperatureException { ... }
```

4. Annotation Processors

One or more annotation processors may be used for processing annotations. An annotation processor P may process annotations of a type claimed to be processed by the annotation processor. For example, an annotation processor P may claim to process an annotation of a type Critical corresponding to the above annotation @Critical. The annotation processor P may claim annotations of type Critical by reciting:
@SupportedAnnotationTypes("Critical")

Any annotation claimed by the annotation processor P may be determined by executing a method. For example, getSupportedAnnotationTypes( ) may be executed to obtain a return value corresponding to an annotation type Critical claimed by annotation processor P.

In an embodiment, annotation processors claim an annotation type within a specific module. As an example, an annotation processor X identifies a specific module M when claiming to process the annotation type A. Annotation A found within the specified module M are processed by the annotation processor P. Annotation A found within any other module (e.g., module N) are not be processed by the annotation processor P. As a prototype example, getSupportedAnnotationTypes( ) may return a.b.C which means annotation type C in package a.b is a supported type of the processor, regardless of what module C is in. Alternatively, getSupportedAnnotationTypes( ) may return foo/a.b.C which means annotation type C in package a.b of module foo is a supported type of the processor. If the compilation also happened to have the annotation type a.b.C in module bar, a.b.C in module bar would not be claimed by the processor.

Processing an annotation by an annotation processor may include invoking a method of the annotation processor which executes a set of operations corresponding to the annotation. As described above, annotation processors may use a set of reflective Application Programming Interfaces (API) and supporting infrastructure to perform the processing of annotations. Annotation processors can produce informational messages or create additional source files or resources, which in turn may be compiled and processed, and also modify the annotated code itself. While an annotation processing API may allow for modification of source code (e.g., adding annotations, adding methods, etc.) in accordance with one or more embodiments, some embodiments may, by design, prevent modification of source code. The result (values, code, messages, etc.) produced by an annotation processor may be visible to other annotation processors depending on a configuration associated with executed annotation processor and/or the other annotation processors.

In an example related to the Java API, which should not be construed as limiting the scope of any of the claims, an annotation processing framework provides a selected annotation processor with an object implementing the interface ProcessingEnvironment. The annotation processor can use facilities provided by the framework to write new files, report error messages, and find other utilities. Third parties may wish to provide value-add wrappers around the facility objects from the interface ProcessingEnvironment. For example, a Filer extension may allow multiple processors to coordinate writing out a single source file. For annotation processors running in a context where the side effects of the annotation processors could be visible to other annotation processors via the API, the tool infrastructure may need to provide corresponding facility objects that are .equals, Filers that are .equals, etc. In addition, the tool invocation may need to be able to be configured such that from the perspective of the running annotation processors, at least the chosen subset of helper classes are viewed as being loaded by the same class loader. (Since the facility objects manage shared state, the implementation of a wrapper class must know whether or not the same base facility object has been wrapped before.)

As another example, an annotation processor may be configured to verify that all fields of an immutable class are declared as final. This example includes a user-defined SimpleAnnotationProcessor which is a subclass of AbstractProcessor defined in the Java API. The SimpleAnnotationProcessor class may present an alert in response to discovering fields of an immutable class that are not declared as final. An example of a SimpleAnnotationProcessor class is recited below.

```
@SupportedAnnotationTypes("....processor.Immutable")
public class SimpleAnnotationProcessor extends AbstractProcessor {
...
for (TypeElement elt : typesIn(roundEnv.getRootElements( )))
{
   for (VariableElement field : fieldsIn(elt.getEnclosedElements( )))
   {
      if (!field.getModifiers( ) ...)
      {
         processingEnv.getMessager( ).printMessage
         (Diagnostic.Kind.ERROR, String.format("Class '%s' is
         annotated as @Immutable, but field '%s' is not declared
         as final", typeElement.getSimpleName( ),
         variableElement.getSimpleName( ) ...
      }
   }
}
}
```

5. Deterministic Selection of Annotation Processors

One or more embodiments include executing a deterministic process for selecting annotation processors for processing annotations by a compiler or a runtime environment. The deterministic process searches for and selects annotation processors from different locations, a class path, a module path, and/or combinations thereof.

The deterministic process for selecting annotation processors may be a predefined deterministic process (for example, defined prior to use of the process in searching for and/or selecting annotation processors for processing annotations). Any software component may execute the deterministic process for selecting annotation processors. The software component may, for example, be a component of a compiler, or may be implemented separately from the compiler. Example operations, as included herein, are equally applicable to any software and/or hardware component(s) that include functionality to select annotation processors via a deterministic process. Furthermore, examples herein refer to a compiler performing operations related to the selection and/or use of annotation processors for processing annotations. Examples, referring to a compiler, are equally applicable to any other software and/or hardware component(s), separate from a compiler, that may select and/or use annotation processors for processing annotations. Accordingly, the reference to compilers executing operations to select and/or use annotation processors should not be construed as limiting the scope of any of the claims.

FIG. 1 illustrates an example set of operations for a deterministic process for selecting annotation processor(s) for processing annotations. One or more operations illustrated in FIG. 1 may be modified, rearranged, or omitted all together. Accordingly, the particular sequence of operations illustrated in FIG. 1 should not be construed as limiting the scope of one or more embodiments.

Initially, an annotation to-be-processed is detected in accordance with one or more embodiments (Operation 152). The annotation may be detected in a source file or a class file. As an example, the annotation in a source file may be detected during a traversal/parsing of the source file and/or during a compilation of the source file. An annotation may be detected in a source file prior to completion of the compilation of the source file. The annotation may be detected, for example, by searching for/identifying keywords, special characters, or symbols (e.g., '@') that are known to correspond to annotations in the particular source file. Annotations may be detected in original source files or in source files created during the processing of previously detected annotations. Detecting annotations may be an iterative process with annotations created/detected in each annotation processing cycle until no new annotations are detected in a new source file generated during annotation processing.

In an embodiment, annotation processing may be completed in a sequence of rounds. In each round, an annotation processor may be asked to process a subset of the annotations identified in the source and class files produced by a prior round. The inputs to the first round of annotation processing may include the initial inputs to an execution of an annotation processing framework; these initial inputs can be regarded as the output of a virtual zeroth round of processing. If an annotation processor was asked to process on a given round, it may be asked to process on subsequent rounds, including the last round, even if there are no annotations for that annotation processor to process. The tool infrastructure may also ask an annotation processor to process files generated implicitly by the tool's operation.

References to annotation processors are searched in accordance with a predefined deterministic process (Operation 154) to determine whether there are any references to annotation processors (Operation 156). References to annotation processors may be searched for in one or more annotation processor paths.

In an embodiment searching for annotation processors may include searching for any types that implement a particular annotation processor interface within a process path. The types that implement the annotation processor interface may be defined as and determined to be annotation processors. The types, examined for implementing the annotation processor, are bound by the processor path being searched. The types that implement the annotation processor interface may not necessarily be known by an annotation processing framework prior to when annotation processors are searched.

As an example, a module including an annotation processing framework may depend on another module which includes a particular annotation processor interface. The annotation processing framework may search for types in one or more annotation processor paths that implement the particular annotation processor interface. A service loader or other component may serve requests from an annotation processing framework to search for the types in the annotation processor path(s). Specifically, the service loader may identify the types from one or more specified annotation processor paths that implement the particular annotation processor interface. Types, that do implement the particular annotation processor interface, must be included within modules that depend on the module including the particular annotation processor interface (if the types implementing the particular annotation processor interface and the annotation processor interface itself are defined by different modules). A module including an annotation processing framework and a module including annotation processor may both depend on a module including an annotation processor interface implemented by the annotation processor.

In an embodiment, searching for annotation processors, that match a particular annotation processor interface, in the annotation processor path(s) results in identifying a candidate set of annotation processors that are examined for functionality to process the type of the annotation-to-be-processed. The module, defining the annotation processing framework, is modified to depend on the module(s) which define the candidate set of annotation processors (if any of the candidate set of annotation processors are in a different module than the annotation processing framework).

In an embodiment, a "software resource" includes modules or other logical groups of code or functionality, such as logical groups of code where access control and/or dependency requirements are managed at the group-level. A software resource may be associated with an annotation processor. As an example, a particular software resource may provide a blueprint for making or using an annotation processor. The particular software resource may correspond to an annotation processor interface which is implemented by annotation processors. A software resource on a processor path ("initial software resource") may depend directly or indirectly on the particular software resource providing a blueprint for making or using the annotation processor. A direct dependence may involve a module corresponding to the initial software resource directly depending a module corresponding to the particular software resource. An indirect dependence may involve a module corresponding to the initial software resource depending on another module which depends on the module corresponding to the particular software resource. Any number of nested modules may be involved to establish an indirect dependency between the initial software resource and the particular software resource as described above. Annotation processor discovery as described herein may be based on traversal of any software resource identified in a processor path which directly or indirectly depends on another software resource that provides a blueprint for making or using an annotation processor.

In an embodiment, at least one of annotation processor paths includes an annotation processor defined by a module in a module system. As an example, an annotation processor path may identify locations defined by modules d.jmod and e.jmod, as well as locations defined by non-module code a.jar and b.jar. The annotation processor path may be expressed as:

processormodulepath d.jmod, a.jar, b.jar, e.jmod

One or more embodiments include a specific ordering of annotation processors (or references thereof) to be used for searching for annotation processors that can process any particular annotation. The ordering may, optionally, be separate from one or more processor paths which include references to annotation processors. In an example, the ordering may identify both an annotation processor defined by non-module code and an annotation processor defined by a module in a module system. In other words, the ordering of annotation processors may intermingle annotation processors defined by non-module code with annotation processors defined by module(s) in a module system.

As an example, an annotation processor path (also referred to herein as "processor path") may be included for identifying locations where annotations may be discovered and a separate ordering may be included to configure an order in which the annotation processors are to be selected. In this example, annotation processor A is located in non-module code a.jar, annotation processor B is located in non-module code b.jar, annotation processor D is located in module d.jmod, and annotation processor E is located in module e.jmod. The annotation processor path and the order for selecting annotation processors may be expressed, respectively, as:

processormodulepath d.jmod, a.jar, b.jar, e.jmod processor A, E, B, D

In the above example, assuming annotations processors each claimed a same type of annotation to-be-processed; the annotation processor discovery order may be D A B E, while the annotation processor selection order may be A E B D.

One or more embodiments include selecting (a) annotation processors defined by any module in a module system before (b) annotation processors defined by non-module code. One or more embodiments include selecting (a) annotation processors defined by non-module code before (b) annotation processors defined by any module in a module system.

As an example, multiple different processor paths may include references to annotation processors. A processor path P1 may include references to annotation processors defined by any module in a module system. A second processor path P2 may include references to annotation processors defined by non-module code. A deterministic process may be configured for searching and/or using annotation processors referenced in processor path P1 prior to annotation processors referenced in processor path P2. A deterministic process may be configured for searching and/or using annotation processors referenced in processor path P2 prior to annotation processors referenced in processor path P1. A deterministic process may even alternate between processor paths P1 and P2. Any deterministic process involving an ordering for searching and/or using annotation processors from process paths P1 and P2 may be implemented in accordance with one or more embodiments.

As an example, a single processor path P may include both an annotation processor defined by non-module code and an annotation processor defined by a module in a module system. The single processor path may first be traversed to identify all annotation processors defined by non-module code and all annotation processors defined by any module in a module system. Once identified, annotation processors defined by any module in a module system may be prioritized for use over annotation processors defined by non-module code that are in the same processor path. Alternatively, annotation processors defined by non-module code may be prioritized for use over annotation processors defined by any module in a module system in the same processor path.

One or more embodiments include ordering a set of annotation processors, that include both an annotation processor defined by non-module code and an annotation processor defined by a module in a module system, without regard to whether annotation processors correspond to non-module code or correspond to any module in the module system. As an example, the use of annotation processors is based on the order in which references to annotation processors are listed in a processor path P3. The processor path P3 may include both annotation processors defined by non-module code and annotation processors defined by a module in a module system. As another example, annotation processors are searched and/or used using an Iterator. The order of searching and/or using annotation processors is based on the iteration order corresponding to the annotation processors.

If annotation processors are not found during operation 154, the process for processing annotations may end. Notifications and/or errors may be generated indicating that annotation processors necessary for processing a particular annotation have not been found. Any other type of handling mechanism may be implemented for failure to find annotation processors in general or failure to find annotation processors that claim a type of an annotation to-be-processed.

If a reference to an annotation processor is found in accordance with the predefined deterministic process, then the annotation processing framework determines whether the annotation processor claims to process a type of the annotation to-be-processed (Operation 158). The system determines the type(s) of annotations claimed by the annotation processor. As an example, the system may invoke a method on the object corresponding to the annotation processor to determine the type(s) of annotations claimed by the annotation processor. The Java API defines a method getSupportedAnnotationTypes( ) which may be invoked on an object of type Processor to obtain the types(s) of annotations claimed by the annotation processor. If the annotation to-be-processed is compared to the type(s) of annotations claimed by the annotation processor to determine if the annotation processor claims the type of the annotation to-be-processed. In an embodiment, an object of the type of the annotation processor is obtained (Operation 160). As an example, a constructor defined by the annotation processor factory may be invoked to obtain an object of the type of the annotation processor. The annotation is then processed using the object of the type of the annotation processor (Operation 162). The same object may be re-used for processing additional annotations in the same source code, or in new source code generated during annotation processing. Processing the annotation may include executing a set of operations corresponding to the annotation. Processing annotations may be used, for example, to detect errors, suppress warnings, and generate code or XML files.

6. Architectural Overview

FIG. 2A illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 2A, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, one or more class loaders 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

Source code files 101 may reference a set of subroutine definitions, protocols, and tools defined as an Application Programming Interface (API). As an example, the Java API, defined in the context of the Java programming language, is a collection of prewritten packages, classes, and interfaces with their respective methods, fields and constructors. Embodiments herein described with reference to specific Application Programming Interfaces (APIs) should not be construed as limited to those specific APIs.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the Java Virtual Machine (JVM), the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "type" defined in the source code files 101 (or dynamically generated by the compiler 102/virtual machine 104). Examples of "types" include a class and an interface. A class is a template for the properties and behaviors of objects associated with the class. The class includes fields and methods associated with the objects of the class. An interface includes abstract methods that may be implemented by a class. A class that implements an interface inherits the abstract methods of the interface and provides a body to each abstract method. However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of types that provide related functionality. For example, a library may contain one or more class files that implement input/output (I/O) operations, mathematics tools, cryptographic techniques, graphics utilities, and so forth. Further, some types (or fields/methods within those types) may include access restrictions that limit their use to within a particular class/library/package or to classes with appropriate permissions.

6.1 Example Class File Structure

Figure 2B:
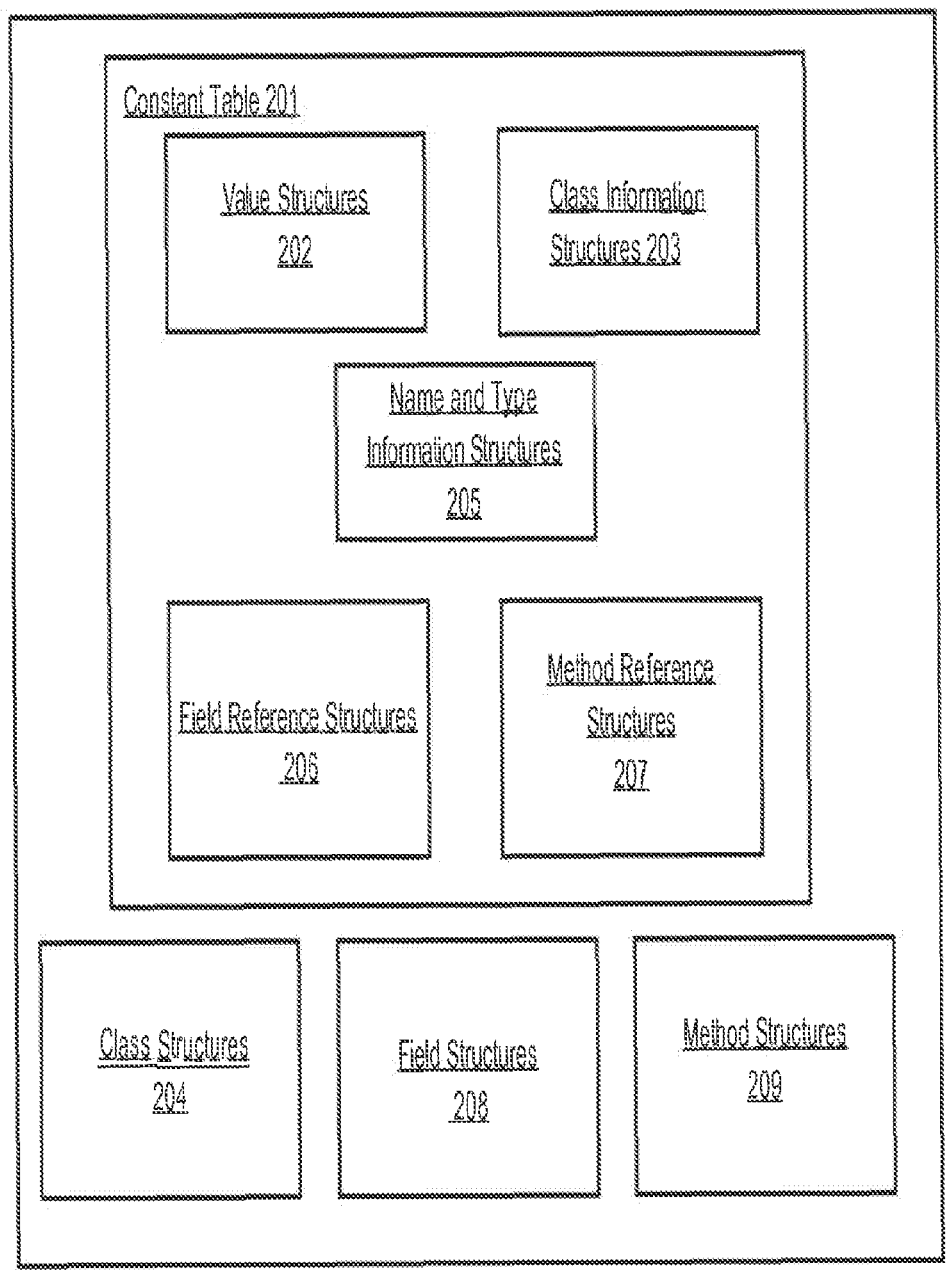
FIG. 2B is a block diagram illustrating one embodiment of a computer system suitable for implementing methods and features described herein.

FIG. 2B illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class (or type) represented by the class file 200.

In FIG. 2B, the class file 200 includes a constant table 201, field structures 208, class structures 204, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class.

The name and type information structures 205 hold an index into the constant table 201 to one of the value structures 202 storing the name of the field/method and an index into the constant table 201 to one of the value structures 202 storing the descriptor.

In an embodiment, class structures 204 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameter type(s) of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 112. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

6.2 Example Virtual Machine Architecture

Figure 3:
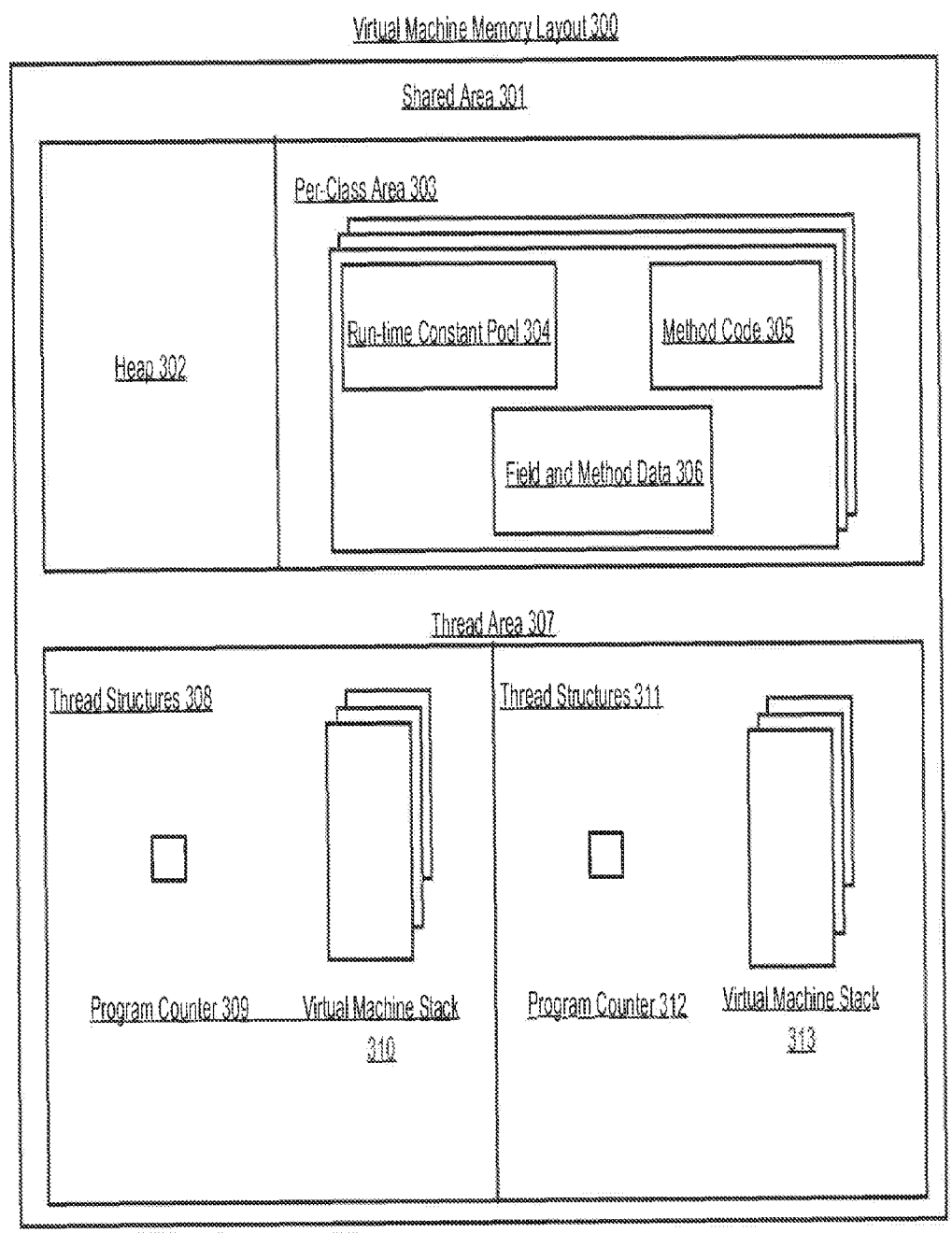
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
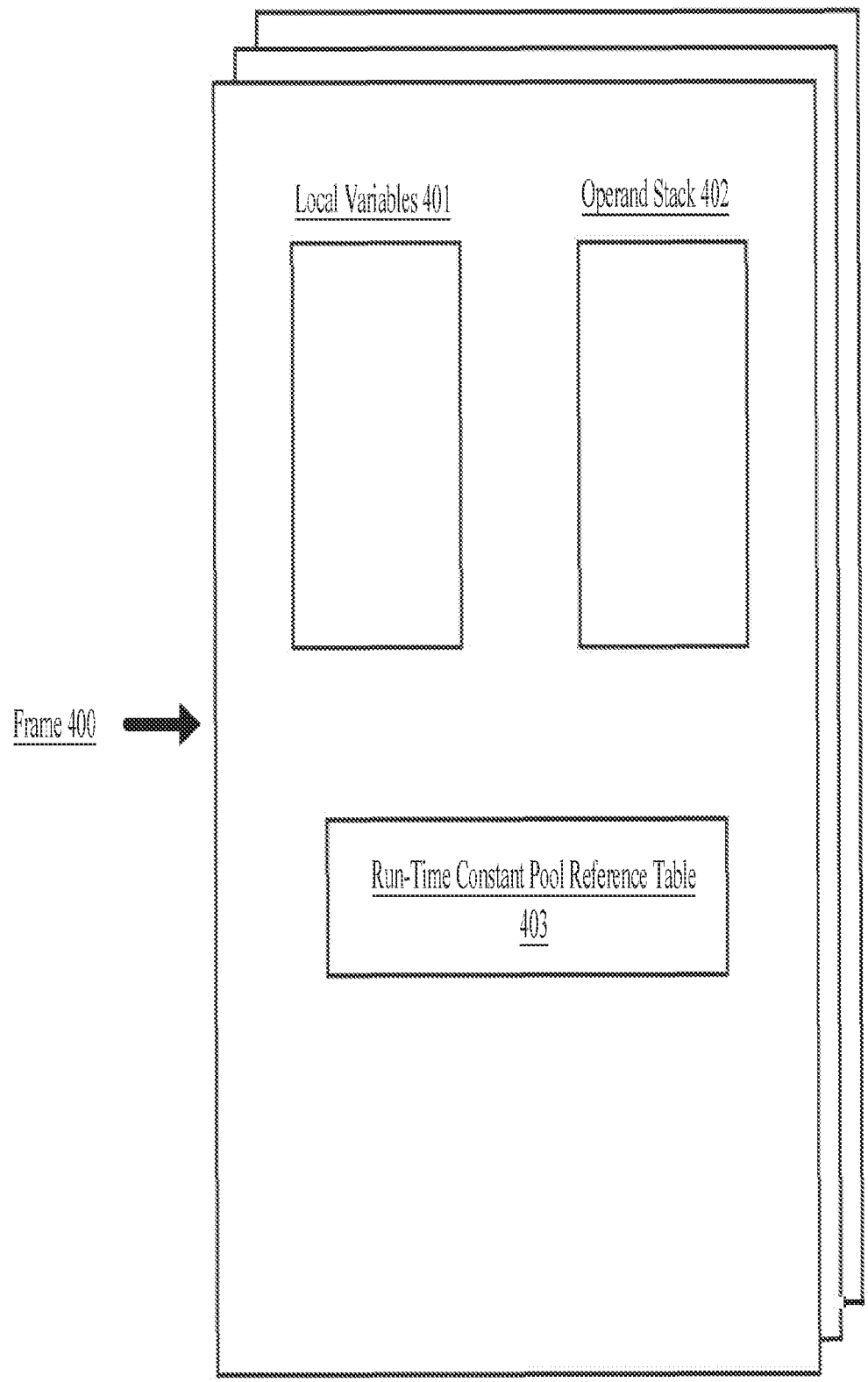
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

6.3 Loading, Linking, and Initializing

In an embodiment, the virtual machine 104 dynamically loads, links, and initializes types such as classes and interfaces. Loading is the process of finding a class (or type) with a particular name and creating a representation from the associated class file 200 of that class within the memory of the runtime environment 112. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts by invoking a class loader 107 which loads an initial class. The technique by which the initial class is specified will vary from embodiment to embodiment. For example, one technique may have the virtual machine 104 accept a command line argument on startup that specifies the initial class.

To load a class (or an interface or another type), the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303. The loaded type may be referred to herein as a "runtime type."

In some embodiments, when the class loader 107 loads a class, the class loader 107 also iteratively loads the super-classes of the loaded class. The class loader 107 may also iteratively load the required pre-loaded classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class conforms to one or more static constraints and/or structural constraints. Static constraints are those defining the well-formedness of the class file. Structural constraints specify constraints on relationships between instructions of one or more class file. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory addresses from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 iteratively searches through the super-classes of the referenced class for the referenced field/method until the field/method is located, or the top-level superclass is reached, in which case an error is generated.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
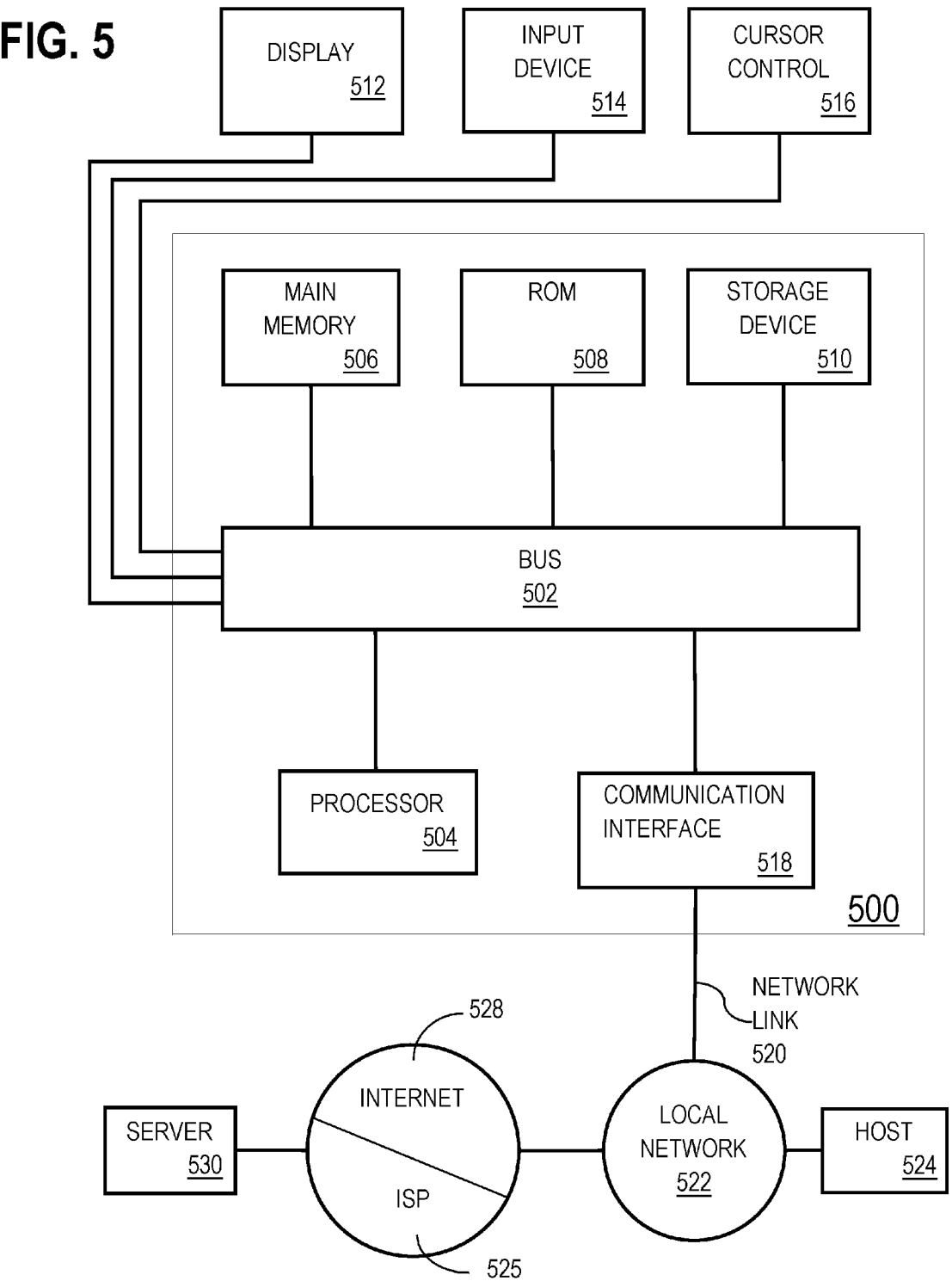
FIG. 5 illustrates a system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 505. Such instructions may be read into main memory 505 from another storage medium, such as storage device 510. Execution of the sequences of instructions contained in main memory 505 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 525. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more hardware processors, cause:
receiving a set of artifacts for processing that includes a file that comprises code and at least one annotation of a first annotation type;
identifying the at least one annotation in the file and determining the first annotation type of the at least one annotation;
identifying:
(a) a first annotation processor having a first functionality defined by non-module code, wherein the first annotation processor processes annotations of the first annotation type; and
(b) a second annotation processor having a second functionality different from the first functionality defined by a first module of a plurality of modules of a module system,
wherein the second annotation processor processes annotations of the first annotation type,
wherein the module system specifies accessibility of at least one package in the first module to other modules in the module system;
wherein identifying the first annotation processor and the second annotation processor is based at least in part on one or more processor paths;
processing the at least one annotation in the file, at least in part by:
using a deterministic predefined process for selecting one of (a) the first annotation processor defined by the non-module code and (b) the second annotation processor defined by the first module as a selected annotation processor for processing the at least one annotation;
executing the selected annotation processor to:
(a) insert functionality of the selected annotation processor; and
(b) refrain from inserting functionality of annotation processors that are not selected.

2. The media of claim 1, wherein the identifying operation comprises searching for annotation processors that implement a particular annotation processor interface.

3. The media of claim 2, wherein the searching operation is executed by a service loader.

4. The media of claim 1, wherein identifying the second annotation processor is responsive at least to determining that the second annotation processor matches a type corresponding to annotation processors.

5. The media of claim 1, wherein the identifying operation is further based on a software resource within a particular processor path, of the one or more processor paths, that has a dependency on another software resource associated with annotation processors.

6. The media of claim 1, wherein the deterministic predefined process determines which of multiple candidate annotation processors, that claim any particular annotation, to select for processing the any particular annotation in an execution context.

7. The media of claim 1, wherein the deterministic predefined process imposes an ordering used to search for and/or select annotation processors for use in processing annotations.

8. The media of claim 1, wherein one of the first annotation processor and the second annotation processor is selected as the selected annotation processor based on an order in which the first annotation processor and the second annotation processor are referenced in the processor path.

9. The media of claim 1, wherein one of the first annotation processor and the second annotation processor is selected as the selected annotation processor based on an order in which the first annotation processor and the second annotation processor are ordered in an ordered list, of annotation processors, that is separate from the processor path.

10. The media of claim 1, wherein each of the first annotation processor and the second annotation processor claim a type of the annotation.

11. The media of claim 10, wherein only one of the first annotation processor and the second annotation processor is used for processing the annotation.

12. The media of claim 10, wherein the operations further comprise prioritizing use of (a) annotation processors defined by any module in the module system over (b) annotation processors defined by non-module code.

13. The media of claim 10, wherein the operations further comprise prioritizing use of (a) annotation processors defined by non-module code over (b) annotation processors defined by any module in the module system.

14. The media of claim 1, wherein the set of artifacts comprises a first plurality of annotation processors in association with a first sequence and a second plurality of annotation processors in association with a second sequence, and wherein the operations further comprise:
selecting a single unified sequence including at least one annotation processor from the first plurality of annotation processors and at least one annotation processor from the second plurality of annotation processors.

15. The media of claim 1, wherein the first module exports the second annotation processor to a second module in the module system, and wherein the processing operation is executed by a second module, in the module system.

16. The media of claim 1, wherein the processing operation is executed by a compiler.

17. The media of claim 1, wherein the processor path references the first annotation processor by the processor path including a reference to a file comprising the first annotation processor.

18. The media of claim 17, wherein the file is a Java Archive file.

19. The method of claim 17, wherein the file is a Java Archive file.

20. The media of claim 1, wherein the processor path references the second annotation processor by the processor path including a reference to a module comprising the second annotation processor.

21. The media of claim 1, wherein the set of artifacts comprises a plurality of annotations, and wherein the deterministic predefined process selects one or more annotation processors for processing each of the plurality of annotations.

22. One or more non-transitory machine-readable media storing instructions which, when executed by one or more hardware processors, cause:
identifying a set of artifacts;
identifying a first processor path referencing at least a first annotation processor defined by non-module code; and
identifying a second processor path referencing at least a second annotation processor defined by a first module of a module system, wherein the module system specifies accessibility of at least one package in the first module to other modules in the module system;
selecting one of (a) the first annotation processor defined by the non-module code and (b) the second annotation processor defined by the first module as a selected annotation processor for processing an annotation in the set of artifacts;
processing the annotation using the selected annotation processor.

23. The media of claim 22, wherein each of the first annotation processor and the second annotation processor claim a type of the annotation.

24. One or more non-transitory machine-readable media storing instructions which, when executed by one or more hardware processors, cause:
identifying an annotation processor claiming to process annotations in a first module of a module system, the annotations in the first module having a particular type, without claiming to process annotations in a second module of the module system, the annotations in the second module having the particular type, wherein the module system specifies accessibility of at least one package in the first module to other modules in the module system;
responsive to the annotation processor claiming to process annotations of the particular type in the first module without claiming to process annotations of the particular type in the second module:
processing a first annotation, in the first module, of the particular type using the annotation processor;
refraining from processing a second annotation, in the second module, of the particular type using the annotation processor.

25. A method comprising:
receiving a set of artifacts for processing that includes a file that comprises code and at least one annotation of a first annotation type;
identifying the at least one annotation in the file and determining the first annotation type of the at least one annotation;
identifying:
(a) a first annotation processor having a first functionality defined by non-module code, wherein the first annotation processor processes annotations of the first annotation type; and
(b) a second annotation processor having a second functionality different from the first functionality defined by a first module of a plurality of modules of a module system,
wherein the second annotation processor processes annotations of the first annotation type,
wherein the module system specifies accessibility of at least one package in the first module to other modules in the module system;
wherein identifying the first annotation processor and the second annotation processor is based at least in part on one or more processor paths;
processing the at least one annotation in the file, at least in part by:
using a deterministic predefined process for selecting one of (a) the first annotation processor defined by the non-module code and (b) the second annotation processor defined by the first module as a selected annotation processor for processing the at least one annotation;
executing the selected annotation processor to:
(a) insert functionality of the selected annotation processor; and
(b) refrain from inserting functionality of annotation processors that are not selected;
wherein the method is performed by at least one device including a hardware processor.

26. The method of claim 25, wherein the identifying operation comprises searching for annotation processors that implement a particular annotation processor interface.

27. The method of claim 26, wherein the searching operation is executed by a service loader.

28. The method of claim 25, wherein identifying the second annotation processor is responsive at least to determining that the second annotation processor matches a type corresponding to annotation processors.

29. The method of claim 25, wherein the identifying operation is further based on a software resource within a particular processor path, of the one or more processor paths, that has a dependency on another software resource associated with annotation processors.

30. The method of claim 25, wherein the deterministic predefined process determines which of multiple candidate annotation processors, that claim any particular annotation, to select for processing the any particular annotation in an execution context.

31. The method of claim 25, wherein the deterministic predefined process imposes an ordering used to search for and/or select annotation processors for use in processing annotations.

32. The method of claim 25, wherein one of the first annotation processor and the second annotation processor is selected as the selected annotation processor based on an order in which the first annotation processor and the second annotation processor are referenced in the processor path.

33. The method of claim 25, wherein one of the first annotation processor and the second annotation processor is selected as the selected annotation processor based on an order in which the first annotation processor and the second annotation processor are ordered in an ordered list, of annotation processors, that is separate from the processor path.

34. The method of claim 25, wherein each of the first annotation processor and the second annotation processor claim a type of the annotation.

35. The method of claim 34, wherein only one of the first annotation processor and the second annotation processor is used for processing the annotation.

36. The method of claim 34, wherein the operations further comprise prioritizing use of (a) annotation processors defined by any module in the module system over (b) annotation processors defined by non-module code.

37. The method of claim 34, wherein the operations further comprise prioritizing use of (a) annotation processors defined by non-module code over (b) annotation processors defined by any module in the module system.

38. The method of claim 25, wherein the set of artifacts comprises a first plurality of annotation processors in association with a first sequence and a second plurality of annotation processors in association with a second sequence, and wherein the operations further comprise:
selecting a single unified sequence including at least one annotation processor from the first plurality of annotation processors and at least one annotation processor from the second plurality of annotation processors.

39. The method of claim 25, wherein the first module exports the second annotation processor to a second module in the module system, and wherein the processing operation is executed by a second module, in the module system.

40. The method of claim 25, wherein the processing operation is executed by a compiler.

41. The method of claim 25, wherein the processor path references the first annotation processor by the processor path including a reference to a file comprising the first annotation processor.

42. The method of claim 25, wherein the processor path references the second annotation processor by the processor path including a reference to a module comprising the second annotation processor.

43. The method of claim 25, wherein the set of artifacts comprises a plurality of annotations, and wherein the deterministic predefined process selects one or more annotation processors for processing each of the plurality of annotations.

44. A method comprising:
identifying a set of artifacts;
identifying a first processor path referencing at least a first annotation processor defined by non-module code; and
identifying a second processor path referencing at least a second annotation processor defined by a first module of a module system, wherein the module system specifies accessibility of at least one package in the first module to other modules in the module system;
selecting one of (a) the first annotation processor defined by the non-module code and (b) the second annotation processor defined by the first module as a selected annotation processor for processing an annotation in the set of artifacts;
processing the annotation using the selected annotation processor,
wherein the method is executed by at least one device including a hardware processor.

45. The method of claim 44, wherein each of the first annotation processor and the second annotation processor claim a type of the annotation.

46. A method comprising:
identifying an annotation processor claiming to process annotations in a first module of a module system, the annotations in the first module having a particular type, without claiming to process annotations in a second module of the module system, the annotations in the second module having the particular type, wherein the module system specifies accessibility of at least one package in the first module to other modules in the module system;
responsive to the annotation processor claiming to process annotations of the particular type in the first module without claiming to process annotations of the particular type in the second module:
processing a first annotation, in the first module, of the particular type using the annotation processor;
refraining from processing a second annotation, in the second module, of the particular type using the annotation processor;
wherein the method is executed by at least one device including a hardware processor.

* * * * *

UNITED STATES PATENT AND TRADEMARK OFFICE
CERTIFICATE OF CORRECTION

Page 1 of 1

PATENT NO. : 10,387,142 B2
APPLICATION NO. : 15/267896
DATED : August 20, 2019
INVENTOR(S) : Gibbons et al.

It is certified that error appears in the above-identified patent and that said Letters Patent is hereby corrected as shown below:

On the Title Page

On page 2, Column 2, under Other Publications, Line 18, delete "/googleldagger/>," and insert -- /google/dagger/>, --, therefor.

On page 3, Column 1, under Other Publications, Line 2, delete "://blogjetbrains." and insert -- ://blog.jetbrains. --, therefor.

In the Specification

In Column 1, Line 35, delete "user" and insert -- user. --, therefor.

Signed and Sealed this
Eighth Day of September, 2020

Andrei Iancu
*Director of the United States Patent and Trademark Office*